Sept. 27, 1955  S. M. BUDZINSKI  2,719,066
FOLDING TABLE FOR VEHICLES INSTRUMENT PANEL
Filed June 24, 1954  2 Sheets-Sheet 1
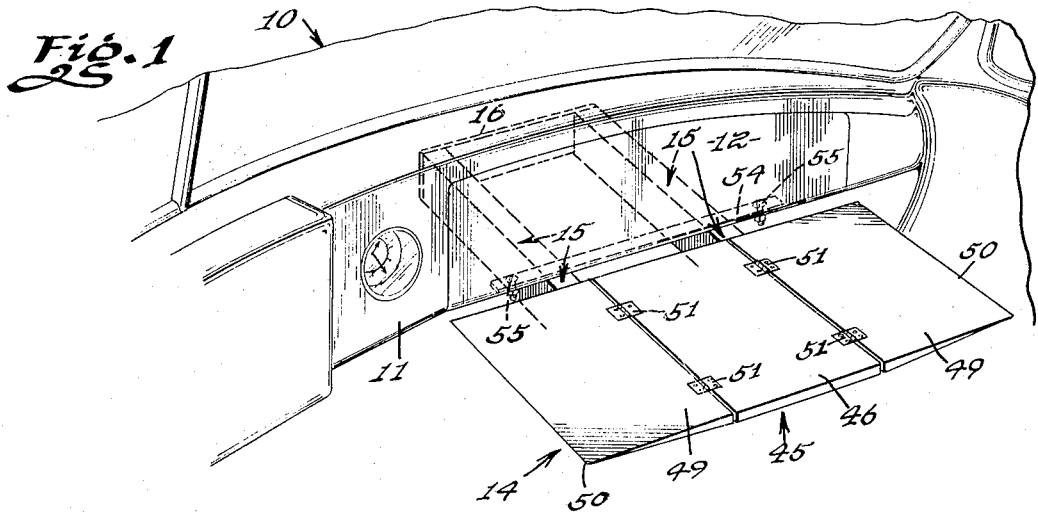
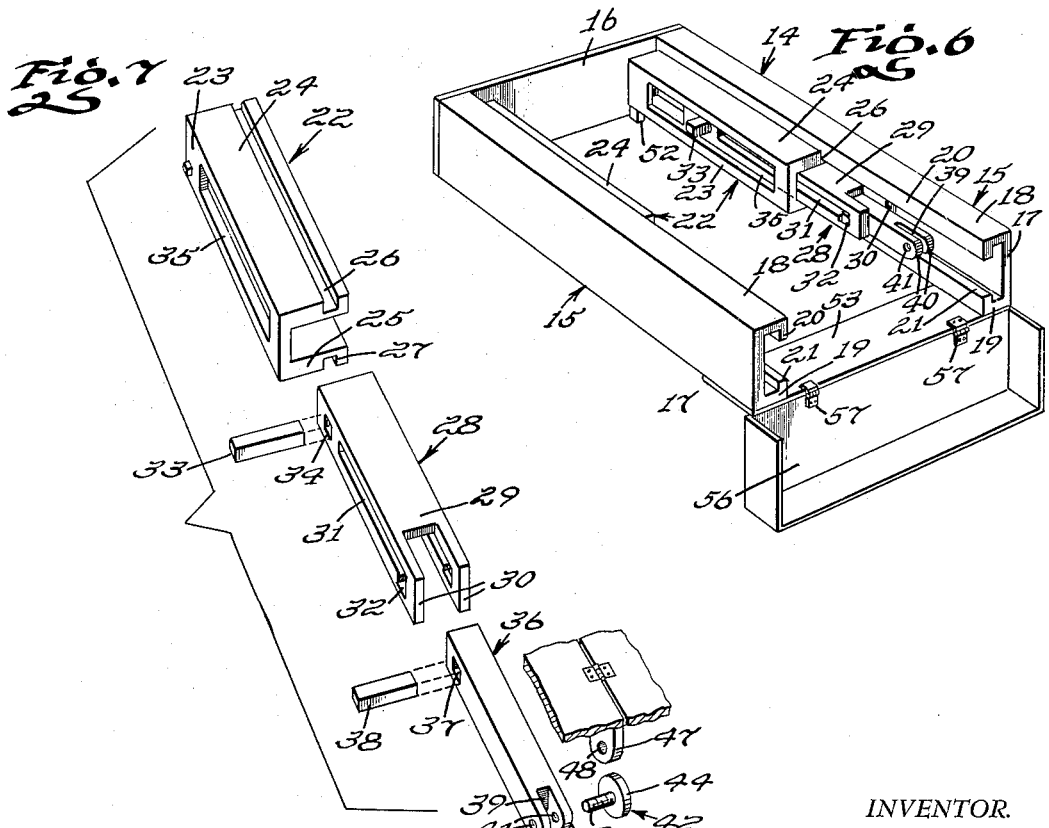
INVENTOR.
Sylvester M. Budzinski
BY Victor J. Evans & Co.
ATTORNEYS

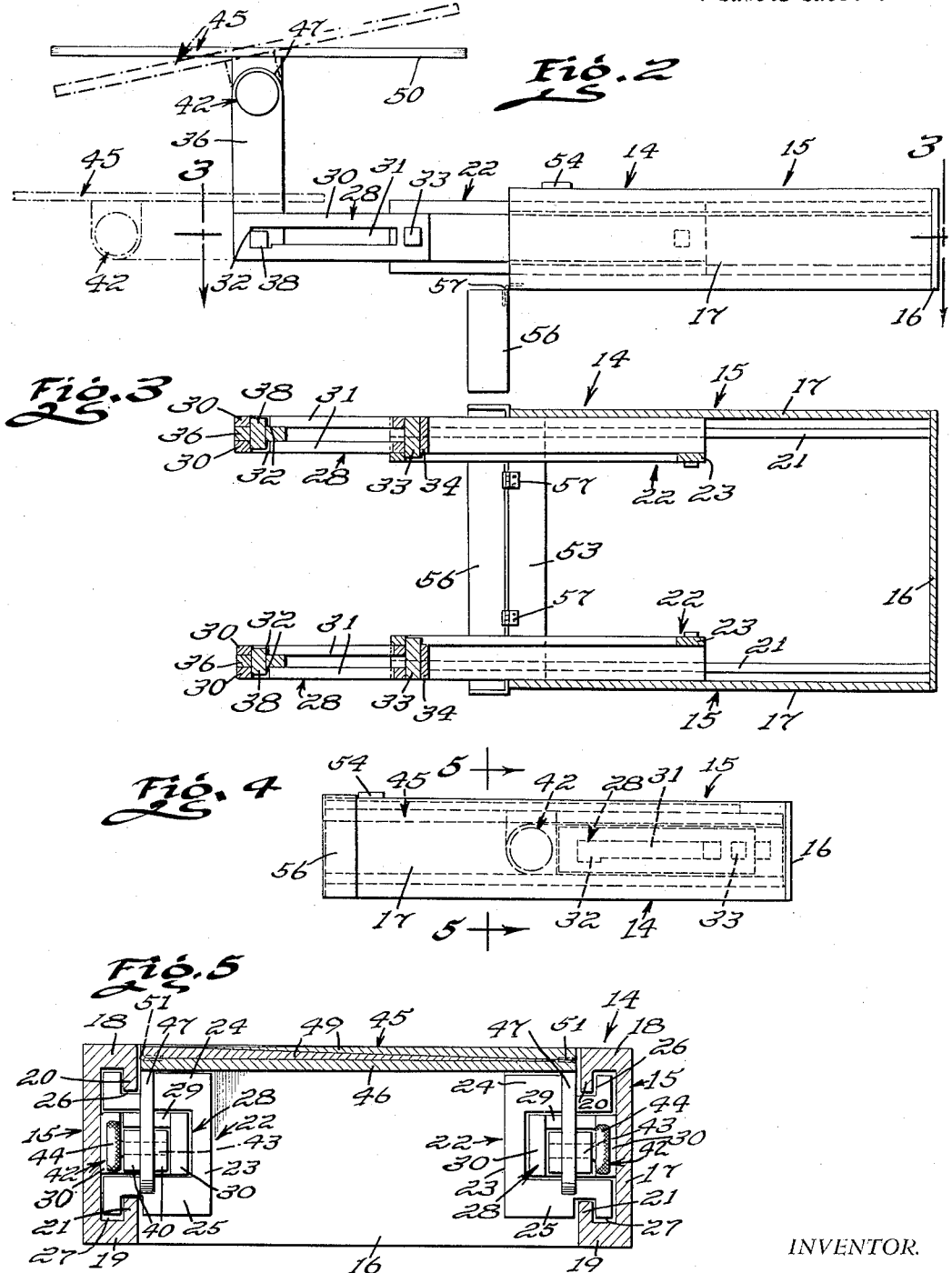

United States Patent Office 2,719,066
Patented Sept. 27, 1955

2,719,066

FOLDING TABLE FOR VEHICLES INSTRUMENT PANEL

Sylvester Martin Budzinski, Worcester, Mass.

Application June 24, 1954, Serial No. 438,954

1 Claim. (Cl. 311—21)

This invention relates to a folding table.

The object of the invention is to provide a tray for attachment to a suitable supporting structure such as the instrument board of a vehicle whereby the table can be readily extended when it is to be used, and whereby the table can be collapsed or folded so that it will occupy a minimum amount of space when it is not being used.

Another object of the invention is to provide a table that can be adjusted to assume different positions and wherein when the table is used in a vehicle such as an automobile, it can be extended to serve as a desk or the like.

Other objects and advantages will be apparent during the course of the following description.

In the acompanying drawings, forming a part of this application, and in which like numerals are used to designate like parts throughout the same:

Figure 1 is a perspective view showing the table extended and being attached to a vehicle instrument board.

Figure 2 is a side elevational view showing the table extended.

Figure 3 is a sectional view taken on the line 3—3 of Figure 2.

Figure 4 is a side elevational view showing the position of the parts when the table is folded.

Figure 5 is a sectional view taken on the line 5—5 of Figure 4.

Figure 6 is a perspective view showing the table folded, and with the tray removed, and with the front door open.

Figure 7 is a fragmentary exploded view showing part of the mechanism for connecting the tray to the support members.

Referring in detail to the drawings, the numeral 10 designates a portion of a vehicle such as an automobile, and the numeral 11 designates the instrument board of the vehicle which may have a glove compartment door 12 mounted thereon, Figure 1. The present invention is directed to a collapsible or foldable table 14 which, although it is shown as being attached to the vehicle instrument board 11, can also be secured to any other suitable supporting structure as desired.

The table 14 includes a pair of similar support members 15 which are arranged in spaced parallel relation with respect to each other. Extending between the rear ends of the pair of support members 15 and secured thereto in any suitable manner is a transversely extending brace 16, Figure 6. Each of the support members 15 includes a vertically disposed end wall 17, a horizontally disposed top wall 18, and a bottom wall 19. Extending downwardly from the free edge of the top wall 18 and secured thereto or formed integral therewith is a longitudinally extending finger 20, while extending upwardly from the bottom wall 19 is a similar opposed longitudinally extending finger 21 for a purpose to be later described.

Slidably mounted in each of the support members 15 is a body member 22. Each of the body members 22 has the same construction and each comprises an end section 23, a top section 24, and a bottom section 25. The top section 24 is provided with a longitudinally extending groove 26, which slidably engages or receives the downwardly projecting finger 20. The bottom section 25 is provided with a longitudinally extending groove 27 which slidably engages the finger 21.

Slidably mounted in each of the body members 22 is a base 28, Figure 7. Each of the pair of bases 28 has the same construction and each includes a top portion 29 and a pair of spaced parallel side portions 30. Each of the side portions 30 of the base is provided with a longitudinally extending slit 31 which terminates at its front end in an enlarged cutout 32 for a purpose to be later described. Registering apertures 34 are arranged in the rear of each base 28, and a rectangular pin 33 projects through the apertures 34 and through a longitudinally extending slot 35 in the end section 23 of the body member 22. Thus, due to the provision of the pin 33 carried by each base 28, outward sliding movement of the base 28 in the corresponding body member 22 will be limited or stopped when the pin 33 reaches the front of the slot 35.

Slidably mounted in each of the bases 28 is a bracket 36 which has apertures 37 in its rear end. A pin 38 extends through the apertures 37, and the pin 38 is slidably mounted in the slits 31 in the bases 28. Thus, a pivotal connection is provided between the bracket 36 and the base 28 whereby when the pin 38 is seated in the enlarged portion 32 of the slit 31, the bracket 36 can be swung to different angular positions so that the tray can be arranged in any desired position.

The front of each of the brackets 36 is bifurcated as at 39 to define a pair of spaced parallel legs 40, and each of the legs 40 may be provided with threaded apertures 41. A set screw 42 has a threaded shank 43 arranged in engagement with the apertures 41, and the set screw 42 may include a knurled knob 44.

The numeral 45 designates a tray which can be used for supporting any desired article such as articles of food or else it can be used as a writing desk or the like. The tray 45 includes a central section or platform 46 which has ears 47 depending therefrom, and the ears 47 are adapted to project into the bifurcated portion 39 of the bracket 36. Each ear 47 may be provided with an aperture 48 which registers with the apertures 41, and the shank 43 of the set screw 42 projects through the registering apertures 41 and 48 for maintaining these parts in their proper assembled positions. The platform 46 of the tray 45 may be of uniform thickness throughout, and a shelf or extension 49 is hingedly connected to each side edge of the platform 46 by hinges 51, Figure 1. The outer edges of the shelves 49 can be tapered or beveled as at 50 so that when the tray 45 is in its folded position as shown in Figure 5, the tray will have uniform thickness throughout.

Projecting from each body member 22 is a stop pin 52 which is adapted to abut or engage a crosspiece 53 so as to limit outward movement of the body members 22. The crosspiece 53 may extend between the lower front ends of the support members 15 and can be secured thereto in any suitable manner. For securing the table to the instrument board 11, a strip 54 may extend across the tops of the support members 15 and can be secured thereto in any suitable manner, and the strip 54 can be secured to the instrument board 11 by means of bolt and nut assemblies 55 or the like. A cover 56 is hingedly connected to the crosspiece 53 by means of hinges 57, and when the table is not being used the cover 56 can be closed over the end of the structure as shown in Figure 4 so that the entire unit will have an attractive appearance and when the table is to be used, the cover or door 56 can be swung open to the position shown in Figure 2 so that the parts can be readily extended or opened up.

From the foregoing it is apparent that there has been provided a collapsible or folding table which can be secured to any suitable supporting structure as for example a vehicle as shown in Figure 1. When the table is not being used, the parts can be shoved inwardly and the door 56 closed so the parts occupy the position shown in Figure 4. Then, when the table is to be used for supporting articles or to be used as a desk, it is only necessary to open the door 56 so that it swings down to the position shown in Figure 6 due to the provision of the hinges 57. Then, the tray 45 can be moved outwardly from between the pair of support members 15 and as the tray moves outwardly, the body member 22 will slide along the corresponding support member 15 and also the base 28 will slide outwardly through the body member 22. Then, the brackets 36 are moved outwardly through the bases 28 to the desired position and then the shelves 49 are swung from the position shown in Figure 5 to the position shown in Figure 1 so that a wide tray is provided which can be used for conveniently supporting whatever is desired. If desired, the brackets 36 can be swung from the horizontal position shown in Figure 2 to the solid line or vertical position of Figure 2 so that the tray 45 can be supported in a raised position instead of the lowered position shown in broken lines. The pin 38 seated in the enlarged portion 32 of the slits 31 insures that the brackets 36 and tray 45 will not accidentally fall over when it is being supported in its raised position. When the table is not being used the reverse procedure is followed so that the shelves 49 are pivoted to a superposed position with respect to the platform 46, and then the entire mechanism is shoved back inside the unit so that it moves into the space between the pair of support members 15. Then the door 56 is closed to the position shown in Figure 4 so that an attractive compact unit is provided. The various pins 33 and 38 serve to limit outward movement of the parts and the tray can be moved out to any desired position.

The table can be used for any desired purpose and will fold away into a compact unit when it is not being used by tightening the thumb screws 42, the parts can be maintained immobile in their adjusted positions. The table can be quickly and easily extended or collapsed and the table can be secured beneath the instrument board on the vehicle or it can be secured to any other object.

I claim:

A folding table comprising a pair of support members arranged in spaced parallel relation with respect to each other and each of said support members including a vertically disposed end wall and a top and bottom wall arranged in spaced parallel relation with respect to each other, opposed inwardly extending longitudinally projecting fingers extending from the free ends of each of said top and bottom walls, a brace extending between the rear ends of said support members and secured thereto, a body member slidably mounted in each of said support members and each of said body members including an end section provided with a longitudinally extending slot, a top and bottom section extending from said end sections and each provided with a longitudinally extending groove defining a track for slidably engaging said fingers, a base slidably mounted in each of said body members and said base comprising a top portion and a pair of spaced parallel side portions, each of said side portions being provided with an elongated slit terminating in an enlarged cutout at its front end, there being registering apertures in said side portions adjacent the rear end thereof, a pin extending through said apertures and through the slots in said body member, a bracket slidably mounted in said base, a pin extending through the rear of said bracket and through the slits in said base, a tray pivotally connected to said brackets, a crosspiece extending between the lower front ends of said support members, and a cover hingedly connected to said crosspiece.

References Cited in the file of this patent
UNITED STATES PATENTS

| | | |
|---|---|---|
| 609,592 | Shultz | Aug. 23, 1898 |
| 726,787 | Turner | Apr. 28, 1903 |
| 1,482,172 | Weis | Jan. 29, 1924 |
| 1,561,438 | Winship | Nov. 10, 1925 |
| 1,601,634 | Lundeen | Sept. 28, 1926 |
| 1,770,955 | Storm | July 22, 1930 |
| 2,125,476 | Westrope et al. | Aug. 2, 1938 |
| 2,270,557 | Randall | Jan. 20, 1942 |
| 2,592,032 | Henderson | Apr. 8, 1952 |
| 2,630,364 | Gleason | Mar. 3, 1953 |
| 2,634,181 | Hunt | Apr. 7, 1953 |
| 2,655,422 | Gussack | Oct. 13, 1953 |
| 2,657,107 | Bisaga et al. | Oct. 27, 1953 |